Aug. 18, 1936.  B. W. KING  2,051,487

SCALE

Filed July 10, 1934  4 Sheets-Sheet 1

INVENTOR.
Bert W. King
BY
Barnes, Kisselle, Laughlin & Raisch
ATTORNEYS

Aug. 18, 1936.  B. W. KING  2,051,487
SCALE
Filed July 10, 1934  4 Sheets-Sheet 3

INVENTOR.
Bert W. King
BY
Barnes, Kisselle, Laughlin & Raisch
ATTORNEYS

Aug. 18, 1936.  B. W. KING  2,051,487
SCALE
Filed July 10, 1934  4 Sheets-Sheet 4
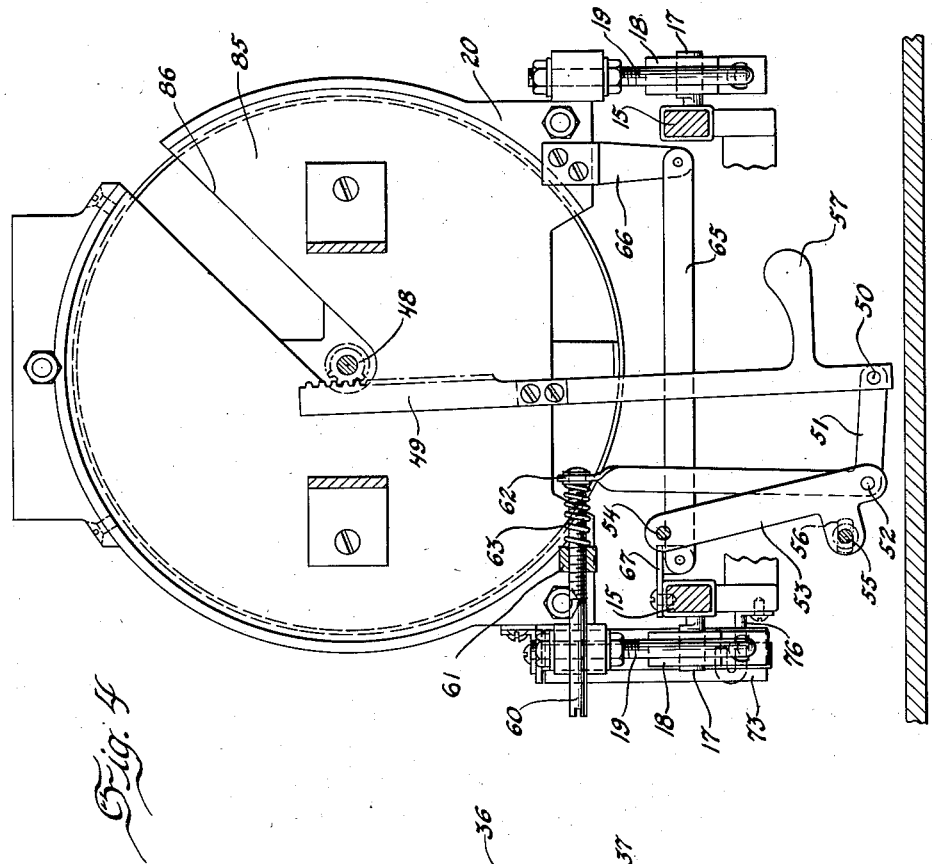
INVENTOR.
Bert W. King
BY
Barnes, Kisselle, Laughlin & Raisch
ATTORNEYS Patented Aug. 18, 1936

2,051,487

UNITED STATES PATENT OFFICE 2,051,487

SCALE

Bert W. King, Detroit, Mich.

Application July 10, 1934, Serial No. 734,490

9 Claims. (Cl. 265—38)

This invention relates to a scale and especially to a scale suitable for counter use in stores, markets and the like. It is the principal object of the invention to provide a low type scale.

The low type scale mentioned is designed so that it has no upstanding post or head which contains the indicator. The uppermost part of the scale is the load receiving platform, and the weight indication is given at a relatively low point. Difficulties arise in the providing of such scale wherein an accurate weight indication is provided and especially wherein the scale is of the computing type. The particular novelty of the present invention resides in an arrangement combining the scale housing and platform, a computing type indicator, such as a drum, and other associated mechanism. To this end the scale of the present invention has a telescoping housing, and weight upon the platform causes the housing to telescope, the movement being transmitted to suitable indicating mechanism. In carrying out the invention the indicator may be of the computing drum type and this is journaled in the moving part of the housing, and it is associated with a relatively fixed member of actuating mechanism to cause rotation thereof for weight indication. These and other objects will be better understood as the detailed description progresses, reference to be made to the accompanying drawings:

Fig. 4 is a sectional view taken on line 4—4 of Fig. 1.

Fig. 5 is a top plan view of the scale.

Fig. 7 is a detailed view showing a spring mounting.

Figure 6:
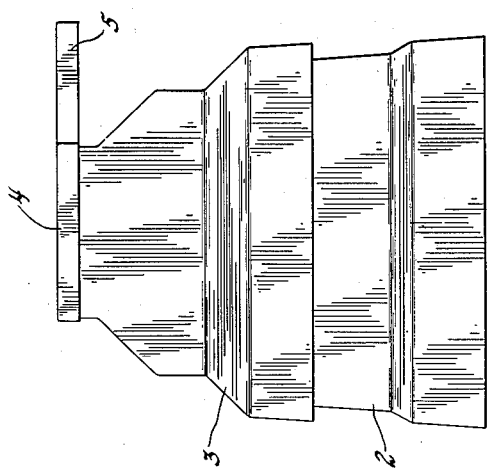
Fig. 6 is an end elevation thereof.

The scale comprises a suitable base 1, and rising from the base is a wall 2 which constitutes the fixed part of the housing. The telescoping or moving part of the housing is shown at 3 having downwardly extending walls as indicated and having a top load receiving surface or platform 4. The top may be relatively narrow, as illustrated in Fig. 5, and its central portion may have an outwardly extending part 5 for increasing the area for the reception of the load, the extending part 5 being shown in Fig. 6, and preferably projecting toward the customer's side of the counter. The extension 5 preferably is confined to the center portion of the platform so as to expose a relatively small sight opening 6 for the customer, which is preferably closed by a suitable transparent section, such as a glass lens 7. This is preferably located in an angular portion of the housing member 3, as shown at 8, so that the customer may peer downwardly and angularly to read the weight indication. The opposite side of the scale, that is the part toward the salesman, has an angular extending part 9 and an elongated sight opening 10, preferably closed by a glass lens 11 for exposing the computing drum.

Figure 2:
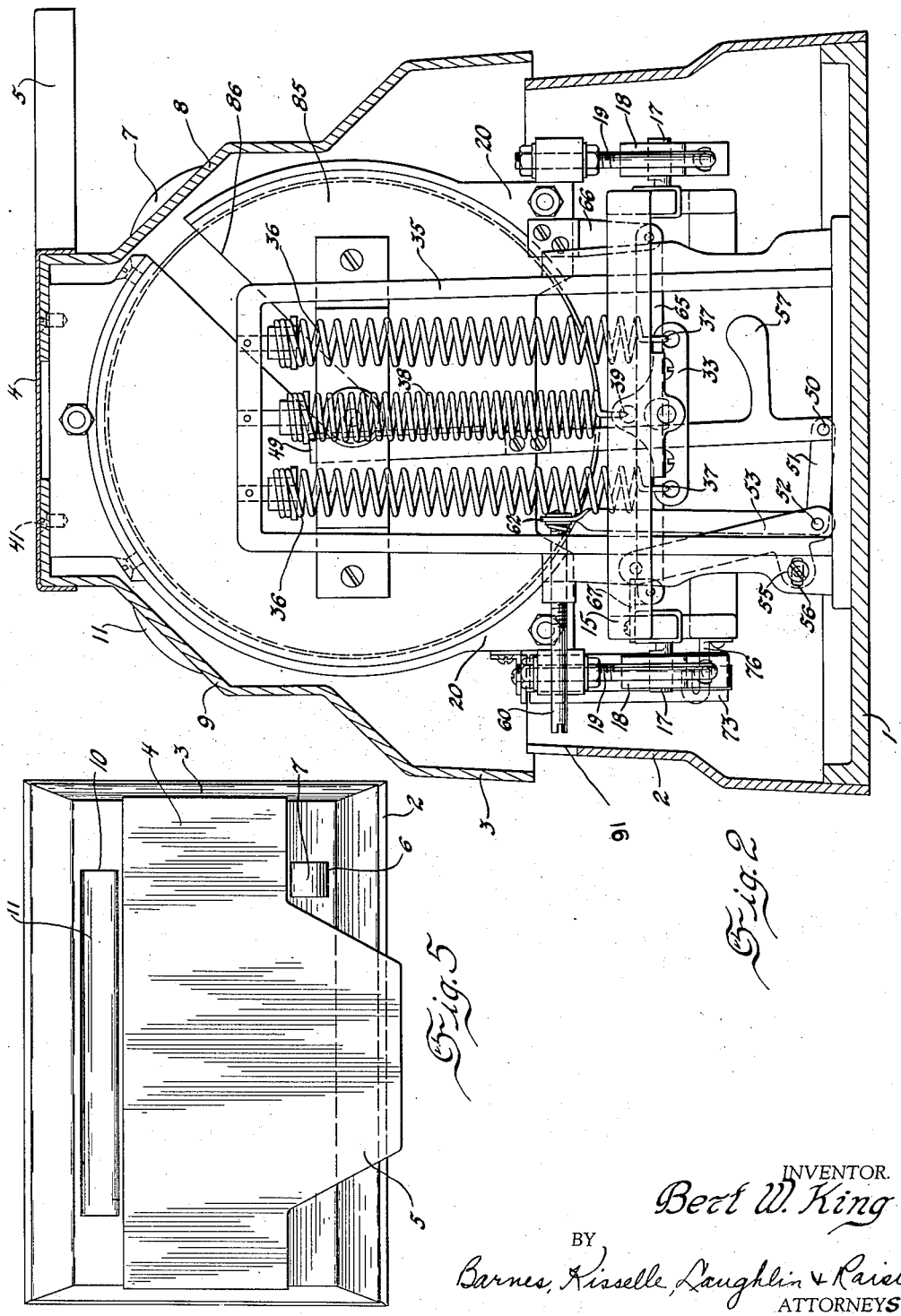
Fig. 2 is a sectional view taken on line 2—2 of Fig. 1.

Suitable scale levers may be mounted on the base and such levers may include a lever 15 fulcrumed on a fixed fulcrum, as at 16, and arranged to carry part of the load on a pivot 17. This pivot may support a depending link 18, and the load transmitted to the link by a yoke 19 fastened as at 21 and 22 to a load carrying frame 20. There are two of such yokes as will be seen by reference to Fig. 2. The lever 15 may be limited in its upward movement by a stop 25. Another lever 26 may be pivoted on a link 27 and the two levers may pivot upon each other as at 28. The lever 26 is arranged to carry a load on pivot point 29, the load being transmitted by a bracket 30 secured by means of screws 31 to the load frame 20.

The lever 15 may be termed the load lever and an arm 33 may be pivoted thereto as at 34. A standard 35, fixed to the base, may carry depending balance springs, two of which are indicated at 36 which connect respectively to the balance arm 33 near the ends thereof, as shown at 37, and the center one of which, shown at 38, is connected to the balance arm as at 39. These springs normally hold the free end of the lever 15 upwardly adjacent the stop 25. Stop 25 stops the upward travel of the free end of the lever 15, due to the recoil of the springs, and thus prevents damage to the mechanism. At zero position the dead load of the platform, etc. extends the springs so that the free end of the lever 15 is held upwardly adjacent the stop 25 but with a clearance roughly of ⅛ to ¼ of an inch. This is the zero position. When weight is placed upon the platform 4, frame 20 shifts downwardly under such weight causing an articulation of the levers and an extenuation of the springs. The frame 20 may include connecting rods 40 and the platform 4 rests upon the same and may be secured thereto by screws 41.

The lever system in the paragraph just described is particularly advantageous for use in this type of scale as it minimizes the over-all height of the lever system. The lever 15 actuates in an arc around the point 16, and due to the fixed pivot connection 28 the lever 26 moves bodily in this same arc which is permitted by the link 27. This structure eliminates a link for interconnecting the levers. This makes it possible to decrease the lever height. A further advantage in this lever system is the fact that the distances 16 to 28 and 28 to 29 are equal; therefore, the angular travel of the fulcrum 29 is equal to that of fulcrum 28 and in the opposite direction, consequently the fulcrum 29 travels approximately in a vertical straight line. Thus the load frame 20, platform and housing 3 travel substantially vertically. Relative movement between the load frame 20 and the pivot point 17 may be taken care of by the link 18.

The computing drum which is shown at 45 is journaled in the frame 20, the same being carried by an axis rod 46 with its ends located in bearings 47. The axis rod may carry a pinion or gear 48, the teeth of which mesh with the teeth of a rack 49. The mounting of the rack is probably best shown in Fig. 4, the same being pivoted as at 50 to a bell crank lever 51 in turn pivoted as at 52 to an adjustable supporting arm 53, which is pivoted as at 54. The arm 53 may be adjusted as to position by means of a screw 55 extending through an elongated slot 56, thus adjustably positioning the point 52 and with it the lower end of the rack. A weight 57 normally tends to swing the rack clockwise as Fig. 4 is viewed, keeping the teeth thereof in close mesh with the teeth of the gear. A zero adjustment resides in an adjusting screw 60 which may be accessible through an opening 91 in the housing, the same being threaded into a fixed member 61 and secured at one end as at 62 to the bell crank 51. A coil spring 63 may be interposed between the fixed member 61 and the end of the bell crank 51 to maintain a snug non-shifting installation. By turning the screw 60 the bell crank 51 is rocked on the connection 52, thus raising or lowering the rack 41 and shifting the drum. In this manner the drum may be adjusted to an accurate zero position.

Due to the fact that the load frame and platform are mounted at one end of the lever system through the means of links 18, means are provided to keep the load frame and platform from shifting or oscillating sidewise, or in a direction transverse to the axis of the computing drum. To this end a check arm 65 may be secured to the load frame 20 by means of a bracket 66 and secured at its opposite end to the lever 26 by means of bracket 67. The check arm 65 is in horizontal alignment with the bearings 29, and the check arm, together with the brackets 66 and 67, are in vertical alignment with these bearings, with the result that the movement of the frame 20, as regards the part of the lever 6 to which it is connected and the movements of the check arm are identical, thus eliminating any binding action.

A dash pot is shown at 70 which may include a suitable piston (not shown) and which is connected by means of a rod 71 to the load frame 20 as at 72. A thermostat is preferably embodied in the structure and the same advantageously comprises bimetallic members 73 secured to the load frame as at 74. A ribbon of strip metal 75 may pass around the curved bimetallic arms and over a pin 76 carried by a lever 15. The vertical movement of the load frame 20 obviously is greater than the vertical movement of the pin 76, so that when a load is placed upon the frame the arms 73 are flexed by a tightening of the ribbon 75. The bimetallic arms tend to straighten out upon heat increase, thus tightening the ribbon 75 and compensating for the weakening of the springs, due to the heat.

Figure 3:
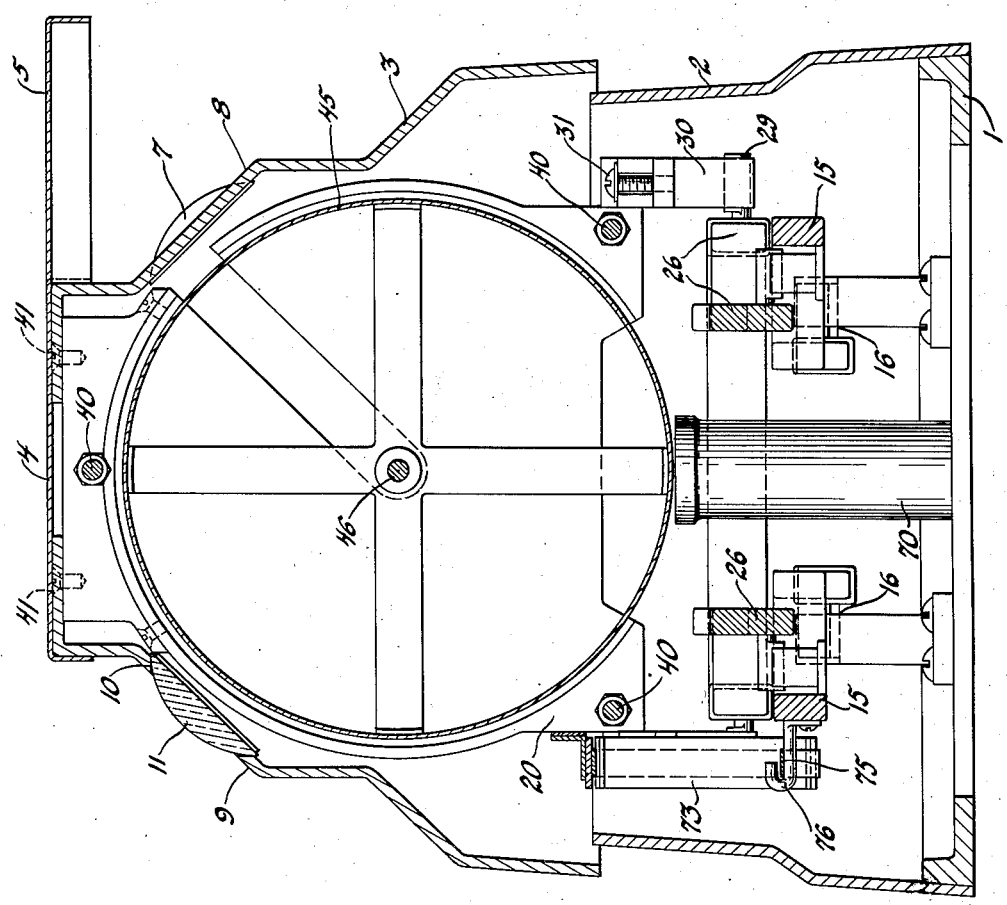
Fig. 3 is a sectional view taken on line 3—3 of Fig. 1.

When a weight is placed upon the platform 5 the load springs are distended, and the free end of the lever 15 moves downwardly, and also, due to the fact that lever 26 is pivoted as at 28 on the lever 15, the free end of this lever moves downwardly. The pivot points 17 and 29 are positioned to have similar vertical movements. The indicating drum, being pivotally mounted in the load frame 20, also moves bodily, with the frame and platform and is caused to rotate by reason of the pinion 28 meshing with the teeth 49. Suitable computing indicia is provided on the drum, and the weight may be read by the salesman through the lens 10. It is advantageous that a separate wheel carrying weight indications be associated with the drum for the reading of the weight by the customer. Such a wheel is shown at 80 mounted upon the shaft 46 at the end of the drum, and this is visible to the customer through the sight opening 6. A few numerals are illustrated upon the drum and wheel in Fig. 1, and obviously one set is inverted with respect to the other. It may be desirable to use a chart on the drum 45 having computing matter printed thereon which is the same as such charts used on scales having upstanding posts. In such scales the salesman and customer view the weight indication from substantially opposite sides of the drum, both of them looking substantially on a horizontal line. In this case the numbers for the salesman and numbers for the customer are 180° apart. With the present scale, however, the customer and salesman look respectively through the sight opening 6 and the sight opening 10, having lines of vision at a substantial angle to each other, as will be appreciated by reference to Fig. 3. The angle there shown is at about 100°, although this angle may vary with different scale designs. Accordingly, the indicia for the customer must be positioned so that when a given weight indication is visible through the sight opening 10, the same weight indication is visible through the sight opening 6. The wheel 80 may be properly adjusted rotationally relative to the drum and fastened to the shaft 46 to give the proper reading. A few numerals are shown on the computing chart and on the wheel 80 in Fig. 1.

The use of three load springs, one of which is weaker than the others, is particularly advantageous with the present scale. The center spring 38 may be of less strength than the springs 36; or on the other hand, it may be a spring identical with spring 36, but not so greatly extended, as is illustrated in Fig. 7. The result of this is that when a load is placed upon a platform it comes to rest for weight indication with a smooth relatively quick action. The presence of the three springs, either of different strengths or different tensions, substantially irons out and to a large degree eliminates choppy action of the scale mechanism coming to rest when a load has been abruptly placed thereon. This may be due to the fact that the springs are not in unison and that the rebound and extending tendency of the two stronger springs are different from the rebound and extending tendency of the third spring. It will be found that this provides a very smooth action in the mechanism coming to rest on the load, eliminating choppy oscillation and more or less ironing out any choppy action with a sort of shock absorbing tendency.

Figure 1:
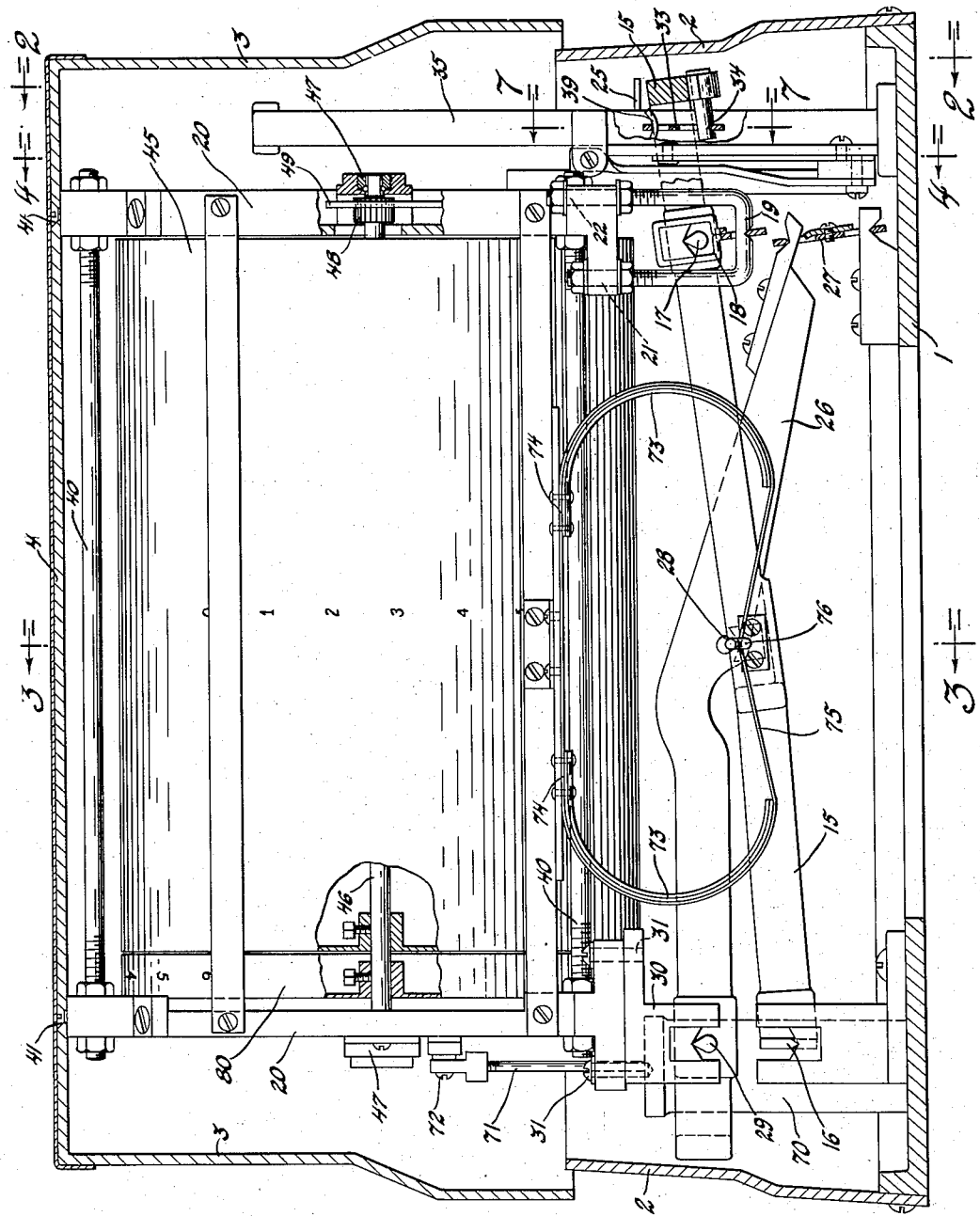
Fig. 1 is a longitudinal sectional view taken through scale in accordance with the invention.

The load receiving frame may have end plates 85 in which the drum is journaled, and these end plates may be slotted as at 86 for the purpose of slipping the drum and its bearings into position. Accordingly, the drum may be installed by merely slipping it into position in the frame after the frame is in place, and it may be removed and again installed or replaced for scale adjustment or repair. The placing of the thermostat in the position shown in Fig. 1 is such that no additional height is needed therefor, and to this end the thermostat is placed lengthwise of the levers and connected, not to two different levers of the mechanism, but to one lever and the load frame.

I claim:

1. In a scale, the combination of scale levers, a load receiving platform carried by the levers, a plurality of load resisting springs acting upon the levers, said springs having different strengths and arranged to soften oscillatory action of the levers, platform and load upon coming to rest under load.

2. In a scale, the combination of scale levers, a load receiving platform carried by the levers, a pair of load resisting springs associated with the levers, another load resisting spring associated with the levers and having a strength different from the strength of the first mentioned springs and all arranged to soften oscillatory movement of the levers and platform as they come to rest under load.

3. In a scale, the combination of scale levers, a load receiving platform supported by the levers, a pair of load resisting springs associated with the levers, another load resisting spring associated with the levers and having a strength which is less than the strength of the first mentioned springs and all arranged to soften oscillatory movement of the levers and platform as they come to rest under load.

4. In a scale, a lever having a fixed fulcrum at one end, a second lever pivotally mounted upon the first on a fixed pivot point, the end of the second lever opposite the fulcrumed end of the first lever being pivotally mounted upon a link, load supporting means having a fixed pivotal connection with the opposite end of the second mentioned lever and having a link connection with the free end of the first mentioned lever, load resisting means for the levers, and a cross-check connecting the load supporting means and the first mentioned lever for holding the load supporting means against side play relative to the first mentioned lever by movement of said links, said cross-check comprising a check arm connected to the lever and load supporting means in horizontal and vertical alignment with the pivotal connection between the free end of the first mentioned lever and the load supporting means.

5. In a scale, a load receiving member, an indicating drum rotatably mounted in the load receiving member and movable therewith, scale levers upon which the load receiving member is mounted, a gear associated with the drum, a rack having teeth meshing with those of the gear, a bell crank upon which the rack is pivotally mounted, and an adjusting screw for rocking the bell crank to adjust the rack lengthwise to effect zero adjustment of the scale.

6. In a scale, a load receiving member, an indicating drum rotatably mounted in the load receiving member and movable therewith, scale levers upon which the load receiving member is mounted, a gear associated with the drum, a rack having teeth meshing with those of the gear, a bell crank upon which the rack is pivotally mounted, an adjusting screw for rocking the bell crank to adjust the rack lengthwise to effect zero adjustment of the scale, a supporting arm upon which the bell crank is pivotally mounted, and means for adjusting the supporting arm to adjust the angular disposition of the rack.

7. A scale comprising, scale levers, a load supporting frame on the levers, load resisting means for the levers, a drum rotatably mounted in the frame and bodily movable therewith, means for rotating the drum as it moves bodily with the frame under load, a pair of curved bimetallic arms secured to the load supporting frame, said arms being oppositely positioned and having their outer convex sides directed toward opposite ends of the scale levers, and a ribbon extending over the convex surfaces of the bimetallic arms and connected substantially midway between the arms to one of the scale levers.

8. A scale comprising, a pair of levers pivotally mounted together substantially at their center line, each lever being pivoted at one end, load supporting means carried by opposite ends of said levers, a pair of curved bimetallic arms secured to the load supporting means, said bimetallic arms being oppositely positioned and having their convex surfaces directed outwardly toward the opposite ends of said levers, said bimetallic arms being one on one side of the pivotal connection between the levers and one on the other side, and a ribbon extending over the convex surfaces of the bimetallic arms and connected to one of the levers at a point in alignment with the pivotal connection between the levers.

9. In a scale, a lever having a fixed fulcrum at one end, a second lever pivotally mounted upon the first lever on a fixed pivot point, the end of the second lever opposite the fulcrumed end of the first lever being pivotally mounted upon a link, load supporting means having a fixed pivotal connection with one lever and having a link connection with the other lever, said connections being adjacent the end of the first lever opposite its fixed fulcrumed end and adjacent the end of the second lever opposite the link, load resisting means for the levers, and a cross check member connected to the load supporting means for holding the load supporting means against side play relative to the first mentioned lever by movement of said links, said cross check comprising a check arm extending crosswise of the levers.

BERT W. KING.